United States Patent
Kowalczyk et al.

(10) Patent No.: US 9,528,910 B2
(45) Date of Patent: Dec. 27, 2016

(54) TESTING PERFORMANCE OF OPTICAL FIBERS IN THE FIELD

(71) Applicant: ADC TELECOMMUNICATIONS, INC., Berwyn, PA (US)

(72) Inventors: Scott C. Kowalczyk, Savage, MN (US); Trevor D. Smith, Eden Prairie, MN (US); Kok Chywn Chuang, St. Paul, MN (US); Erik J. Gronvall, Bloomington, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/472,067

(22) Filed: Aug. 28, 2014

(65) Prior Publication Data
US 2015/0062564 A1  Mar. 5, 2015

Related U.S. Application Data

(60) Provisional application No. 61/919,435, filed on Dec. 20, 2013, provisional application No. 61/871,549, filed on Aug. 29, 2013.

(51) Int. Cl.
*G01N 21/00* (2006.01)
*G01M 11/00* (2006.01)
*G01M 11/08* (2006.01)

(52) U.S. Cl.
CPC .......... *G01M 11/33* (2013.01); *G01M 11/088* (2013.01)

(58) Field of Classification Search
CPC .......... G01M 11/00; G01N 21/88; G02B 6/00
See application file for complete search history.

(56) References Cited

U.S. PATENT DOCUMENTS

| | | | |
|---|---|---|---|
| 5,179,419 A | 1/1993 | Palmquist et al. | |
| 5,724,127 A * | 3/1998 | Csipkes | ............... G01M 11/31 356/73.1 |
| 6,816,661 B1 * | 11/2004 | Barnes | ............... G02B 6/3807 385/134 |
| 7,175,777 B1 | 2/2007 | Labonté et al. | |
| 7,216,270 B1 | 5/2007 | Jacobson et al. | |
| 7,373,069 B2 | 5/2008 | Lazo | |
| 7,447,064 B1 | 11/2008 | Bu et al. | |

(Continued)

FOREIGN PATENT DOCUMENTS

| | | |
|---|---|---|
| WO | WO 2004/061504 A2 | 7/2004 |
| WO | WO 2013/148367 A1 | 10/2013 |

OTHER PUBLICATIONS

International Search Report and Written Opinion for Application No. PCT/US2014/053228 mailed Dec. 3, 2014.

*Primary Examiner* — Tarifur Chowdhury
*Assistant Examiner* — Jamil Ahmed
(74) *Attorney, Agent, or Firm* — Merchant & Gould P.C.

(57) ABSTRACT

Checking continuity along an optical fiber includes mounting an inspection attachment member to a smart phone; inserting a first end of the optical fiber into a receiving arrangement of the inspection attachment member to align the first end with a light source of the smart phone; activating the light source of the smart phone to shine a light along the optical fiber; and determining whether the light is visible at an opposite end of the optical fiber. Certain types of inspection attachment members also are configured to align an end of an optical fiber with a camera lens of the smart phone.

30 Claims, 7 Drawing Sheets

(56) References Cited

U.S. PATENT DOCUMENTS

| | | |
|---|---|---|
| 7,504,340 B1 | 3/2009 | Drizlikh et al. |
| 7,858,428 B1 | 12/2010 | Jacobson et al. |
| 8,004,032 B1 | 8/2011 | Bu et al. |
| 8,241,975 B2 | 8/2012 | Bu et al. |
| 8,343,716 B2 | 1/2013 | Jacobson et al. |
| 2007/0198630 A1 | 8/2007 | Jacobson et al. |
| 2011/0115042 A1 | 5/2011 | Labonté et al. |

\* cited by examiner

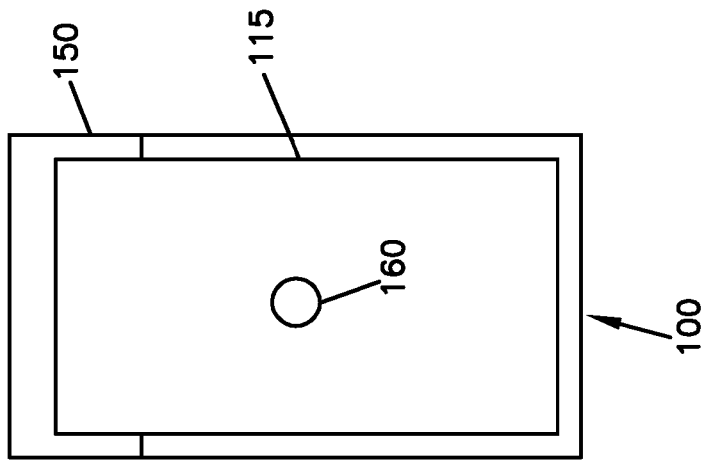
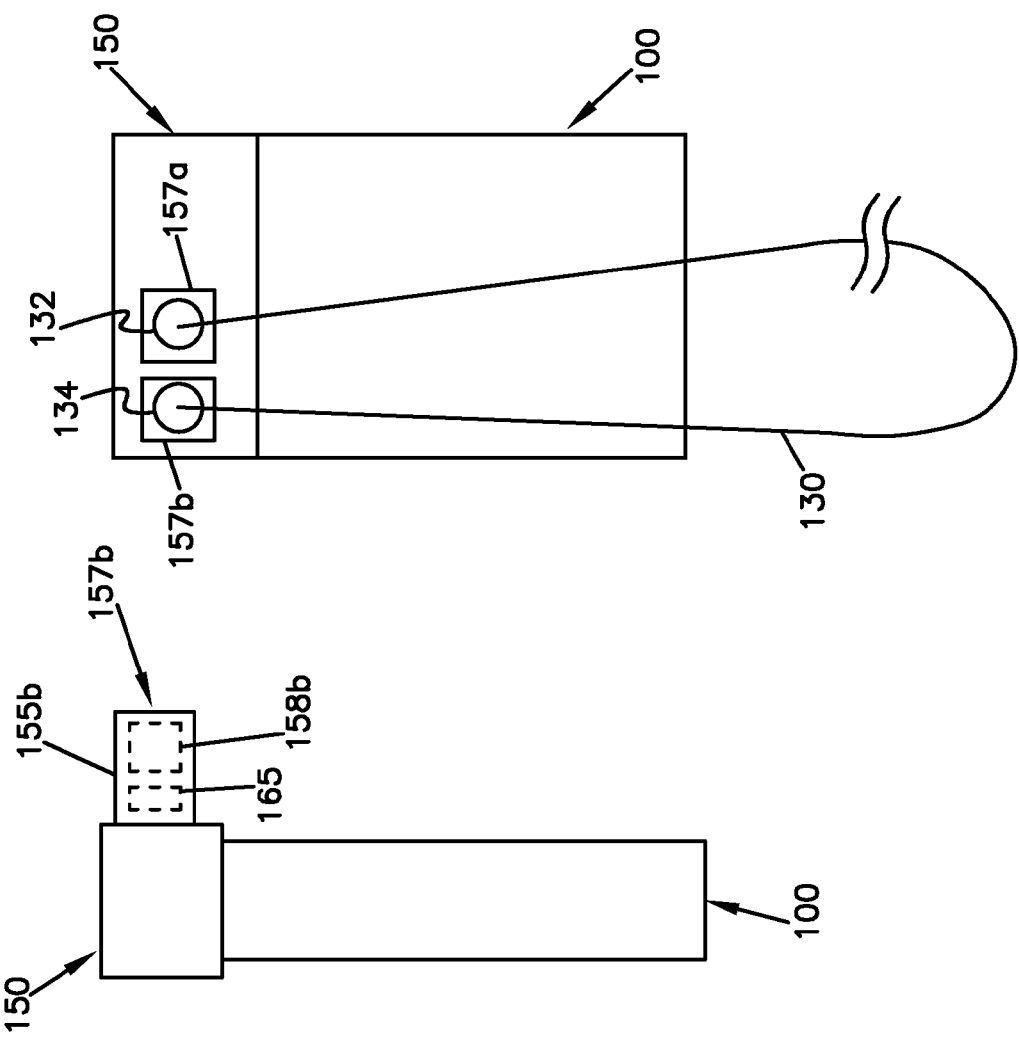
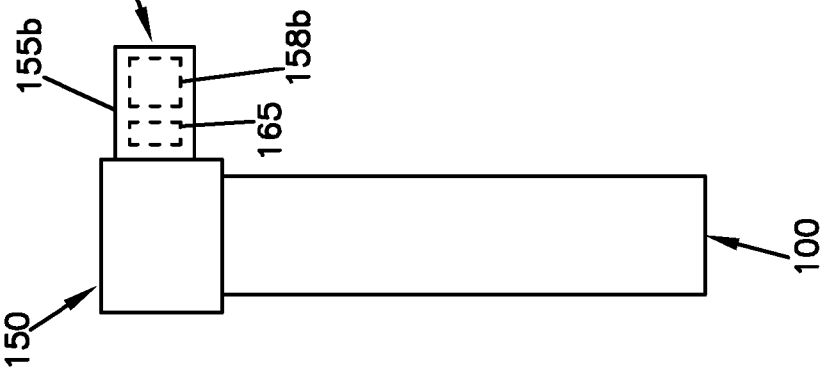

TESTING PERFORMANCE OF OPTICAL FIBERS IN THE FIELD

CROSS REFERENCE TO RELATED APPLICATIONS

This application claims the benefit of U.S. Provisional Patent Application Ser. No. 61/919,435, filed Dec. 20, 2013, entitled TESTING PERFORMANCE OF OPTICAL FIBERS IN THE FIELD, and U.S. Provisional Application Ser. No. 61/871,549, filed Aug. 29, 2013, entitled TESTING PERFORMANCE OF OPTICAL FIBERS IN THE FIELD, the disclosures of which are hereby incorporated herein by reference in their entirety.

BACKGROUND

Fiber optic telecommunications technology is becoming more prevalent as service providers strive to deliver higher bandwidth communication capabilities to customers/subscribers. The phrase "fiber to the x" (FTTX) generically refers to any network architecture that uses optical fiber in place of copper within a local distribution area. Example FTTX networks include fiber-to-the-node (FTTN) networks, fiber-to-the-curb (FTTC) networks and fiber-to-the-premises (FTTP) networks.

FTTN and FTTC networks use fiber optic cables that are run from a service provider's central office to a cabinet serving a neighborhood. Subscribers connect to the cabinet using traditional copper cable technology such as coaxial cable or twisted pair wiring. The difference between an FTTN network and an FTTC network relates to the area served by the cabinet. Typically, FTTC networks typically have cabinets closer to the subscribers that serve a smaller subscriber area than the cabinets of FTTN networks.

In an FTTP network, fiber optic cables are run from a service provider's central office all the way to the subscriber's premises. Example FTTP networks include fiber-to-the-home (FTTH) networks and fiber-to-the-building (FTTB) networks. In an FTTB network, optical fiber is routed from the central office over an optical distribution network to an optical network terminal (ONT) located in a building. The ONT typically includes active components that convert the optical signals into electrical signals. The electrical signals are typically routed from the ONT to the subscriber's residence or office space using traditional copper cable technology. In an FTTH network, fiber optic cable is run from the service provider's central office to an ONT located at the subscriber's residence or office space. Once again, at the ONT, optical signals are typically converted into an electrical signal for use with the subscriber's devices. However, to the extent that an end user may have devices that are compatible with optical signals, conversion of the optical signal to an electrical signal may not be necessary.

FTTP networks include active optical networks and passive optical networks. Active optical networks use electrically powered equipment (e.g., a switch, router, multiplexer or other equipment) to distribute signals and to provide signal buffering. Passive optical networks use passive beam splitters instead of electrically powered equipment to split optical signals. In a passive optical network, ONT's are typically equipped with equipment (e.g., wave-division multiplexing and time-division multiplexing equipment) that prevents incoming and outgoing signals from colliding and that filters out signals intended for other subscribers.

A typical passive FTTP network includes fiber optic cables routed from a central location (e.g., a service provider's central office) to a fiber distribution hub (FDH) located in a local area such as a neighborhood. The fiber distribution hub typically includes a cabinet in which one or more passive optical splitters are mounted. The splitters each are capable of splitting a signal carried by a single fiber to a plurality of fibers. The fibers split out at the splitter are routed from the fiber distribution hub into the local area using a fiber optic distribution cable. Fibers are routed from the fiber distribution cable to subscriber locations (e.g., homes, businesses or buildings) using various techniques. For example, fiber optic drop cables can be routed directly from a breakout location on the distribution cable to an ONT at a subscriber location. Alternatively, a stub cable can be routed from a breakout location of the distribution cable to a drop terminal. Drop cables can be run from the drop terminal to ONT's located at a plurality of premises located near the drop terminal.

Once a fiber optic network has initially been installed, it is often desirable to test the performance of various fiber optic lines/circuits in the network to make sure the lines/circuits satisfy certain minimum performance requirements. Testing systems and methods that reduce labor and equipment cost are needed.

SUMMARY

The disclosure is directed to example inspection attachment members for smart phones, digital cameras, or other such portable devices. The inspection attachment members include a base configured to mount over an end of a portable device; and a receiving arrangement extending outwardly from the base. A fiber alignment member and a securement arrangement are disposed in the receiving arrangement. The fiber alignment member is aligned with an aperture defined in the base of the inspection attachment member.

Certain types of inspection attachment members also include a focusing lens disposed in the receiving arrangement and aligned with a second aperture defined in the base. The focusing lens aids a camera lens of the portable device in focusing on a distal tip of the optical fiber retained at the receiving arrangement.

The disclosure also is directed to processes for checking the performance (e.g., continuity) of optical fibers. Some example inspection processes include mounting an inspection attachment member to a smart phone; inserting a first end of the optical fiber into a receiving arrangement of the inspection attachment member to align the first end with a light source of the smart phone; activating the light source of the smart phone to shine a light along the optical fiber; and determining whether the light is visible at an opposite end of the optical fiber.

Certain example inspection processes include inserting an end of an optical fiber into a receiving arrangement of a smart phone attachment member to align the end with a camera lens of the smart phone; and activating the camera on the smart phone to view the opposite end of the optical fiber on a display screen of the smart phone. Certain example inspection processes include aligning the opposite end of the optical fiber with the light source of the smart phone.

Additional embodiments include an inspection attachment member which allows the connector to be moved relative to the camera of the portable device.

Additional embodiments can include providing a rotatable inspection attachment member for the connector to present the connector end face at an angle relative to the camera.

Additional embodiments may include capturing a photograph of the connector with the portable device.

Additional embodiments may include connector identification devices which can be read by the portable device. For example, RFID tags, QR codes, barcodes, electrical contact arrangements, visual tags with numbers or letters, and other indicia can be read by the portable device. For example, text or numbers or other indicia on an end face of the ferrule can be read by the camera as part of the inspection process. Additionally, or instead of, identification codes can be located on the cable including RFID tags, QR codes, barcodes, other visual indicia, or electronic codes.

In addition, the portable device can include a self-detection application which detects ferrule size and/or an angled ferrule face to automatically identify to the portable device the ferrule type. In some applications, ferrule polishing by different manufacturers results in a different ferrule end face profile which can be used to identify ferrule polishers and processors.

A multi-fiber connector can also be used with the portable device. The inspection attachment member can be provided with a lateral movement mechanism to enable inspection of each individual fiber positioned in the ferrule.

The portable device can complete the inspection as desired by the user, and then communicate the results via email as desired, or to the cloud. Also, the portable device can provide email support for the technician in the field who may have questions about the process and inspection.

In other applications, the portable device can include a dongle attached to the portable device which allows for other types of inspections or testing of the fiber optic cable and/or connector(s). For example, an OTDR, a power meter, a visual inspection camera, a bit error rate measurement device can be connected via a dongle to the portable device. The portable device can include a dongle with a remote test device. With the dongle, the portable device can be used to run a variety of testing and/or inspection applications. Portable device allows increased testing of telecommunications connectors, cables and equipment, such as with an OTDR, a power meter, a visual inspection camera, a bit error rate measurement device which are not internal to the portable device, but all of which can be managed by portable device.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 9 is a side elevational view of the inspection attachment member of FIG. 7 mounted to the portable device of FIG. 1 where components disposed within an interior of a receiving arrangement of the inspection attachment member are shown;

FIG. 10 is a rear view of FIG. 9 with a fiber optic cable mounted at the inspection attachment member;

FIG. 11 is a front view of FIG. 10 so that the display screen is visible.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 2:
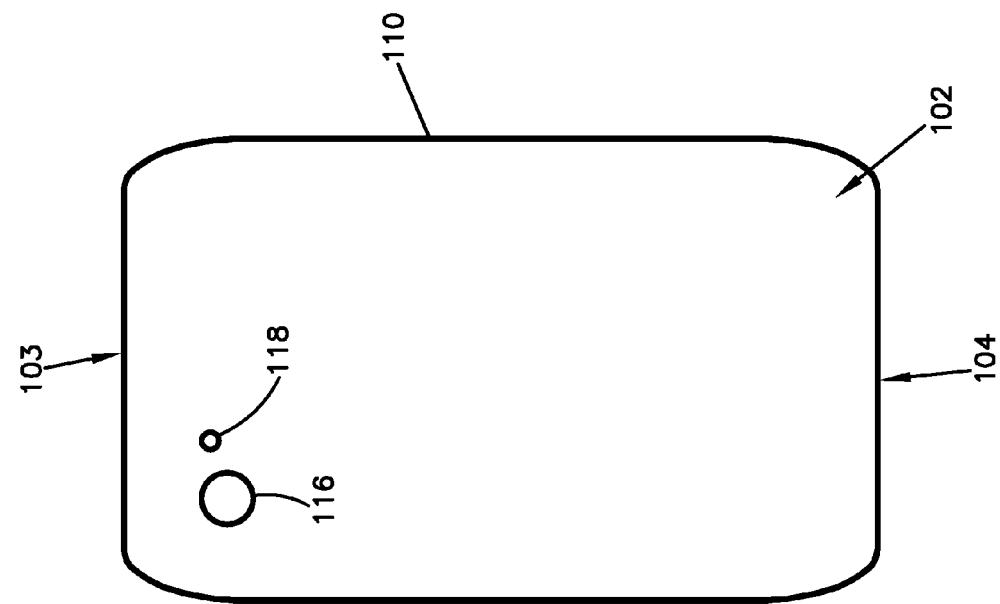
FIG. 2 is a rear view of the portable device of FIG. 1.
Figure 1:
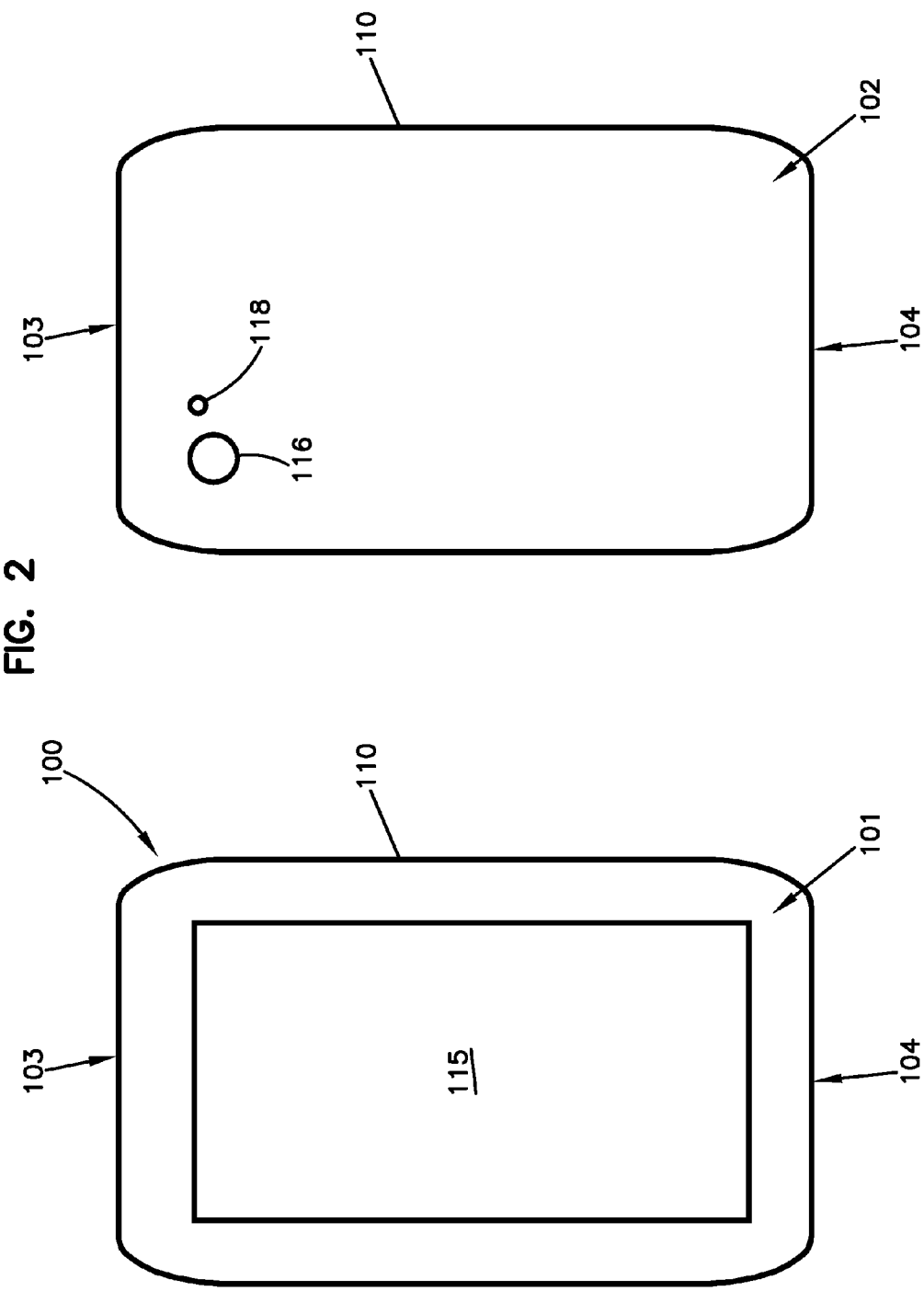
FIG. 1 is a front view of an example portable device including a display screen and light source.

FIGS. 1 and 2 illustrate one example portable device 100 including a body 110 having a front 101, a rear 102, a top 103, and a bottom 104. The front 101 of the portable device 100 includes a display screen 115. The rear 102 of the portable device 100 includes a light source 118 and a camera lens 116. The portable device 100 includes circuitry and/or software that cause images of objects viewed through the camera lens 116 to appear on the display screen 115. The circuitry and/or software also cause the light source to emit light to illuminate the objects viewed through the camera lens 116 to improve the quality of images appearing on the display screen 115.

In various implementations, the portable device 100 includes a keypad, a mouse, a controller, buttons, a microphone, and/or any other type of input interface. In certain implementations, the display screen 115 is a touch screen through which input can be provided to the circuitry and/or software of the portable device 100. In certain implementations, the portable device 100 can include speakers and/or any other type of output interface. In some implementations, the portable device 100 includes a digital camera. In other implementations, the portable device 100 includes a smart phone. For example, the portable device 100 can include an iPhone® sold by Apple Inc. In other implementations, the portable device 100 includes a tablet computer.

Figure 3:
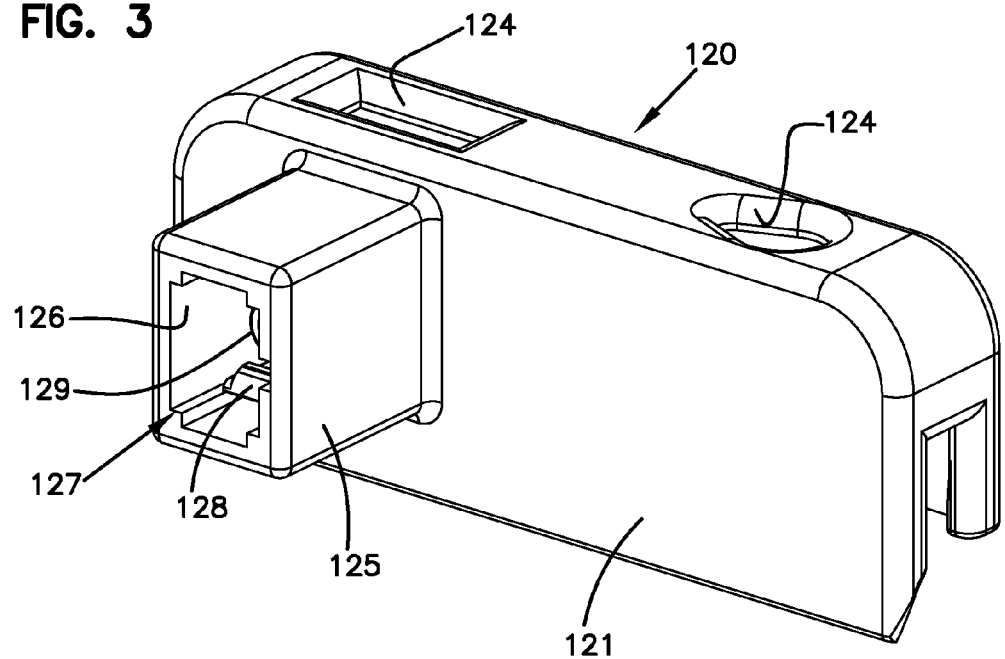
FIG. 3 is a top perspective view of a first example inspection attachment member configured in accordance with the principles of the present disclosure.
Figure 4:
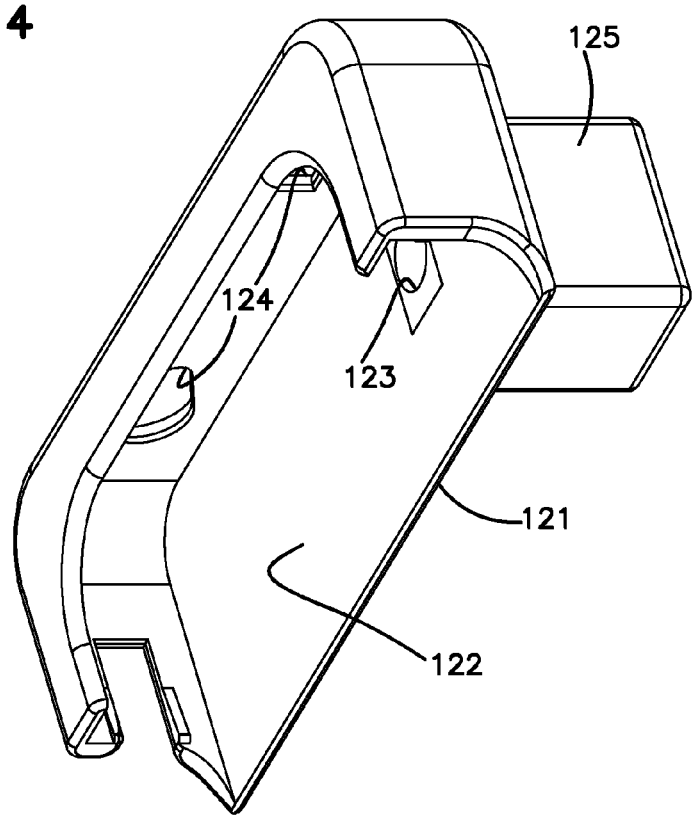
FIG. 4 is a bottom perspective view of the inspection attachment member of FIG. 3.

FIGS. 3 and 4 illustrate one example inspection attachment member 120 that is configured to mount to the portable device 100 of FIGS. 1 and 2. The inspection attachment member 120 includes a base 121 defining an interior 122. The base 121 is sized and shaped to fit over an end (e.g., the top 103, the bottom 104, etc.) of the portable device 100 so that the end of the portable device 100 is disposed within the interior 122 of the base 121. The base 121 also defines ports 124 that provide access to ports on the portable device 100. The base 121 may also define a cutout to inhibit blocking the display screen 115.

The base 121 defines a first aperture 123 that is configured to align with the light source 118 of the portable device 100 when the inspection attachment member 120 is mounted to the portable device 100. The inspection attachment member also includes a receiving arrangement 125 extending outwardly from the base 121. The receiving arrangement 125 defines a first passage 126 that extends from the first aperture 123 to a distal end of the receiving arrangement 125. The distal end of the receiving arrangement defines a connection port 127. A securement arrangement 128 is disposed within the passage 126 to retain an optical connector inserted into the connection port 127. In certain implementations, a fiber alignment member 129 also is disposed within the first passage 126 to align an optical fiber terminated by the optical connector with the first aperture 123.

Figure 5:
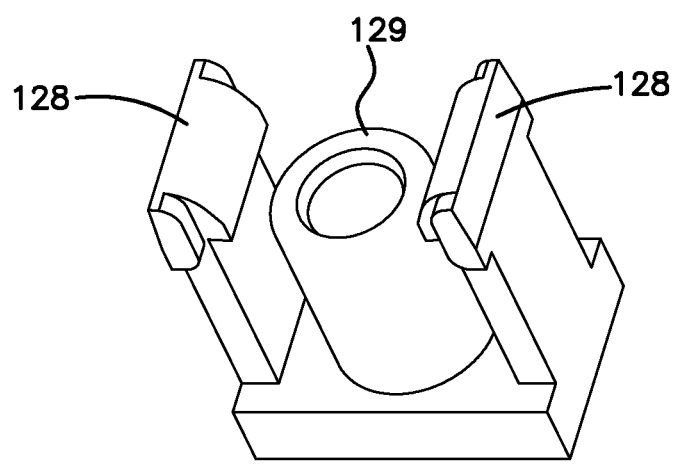
FIG. 5 is a perspective view of an example securement arrangement and alignment member suitable for use with any of the inspection attachment members disclosed herein.

In certain implementations, the fiber alignment member 129 includes a sleeve (e.g., a split sleeve) aligned with the first aperture 123 and configured to receive a ferrule of an optical connector. In certain implementations, the securement arrangement 128 includes latching arms configured to snap over sides of the optical connector. In certain examples, the securement arrangement 128 and fiber alignment member 129 form half of an optical adapter (e.g., see FIG. 5). In an example, the securement arrangement 128 and fiber alignment member 129 form half of an SC adapter.

Figure 6:
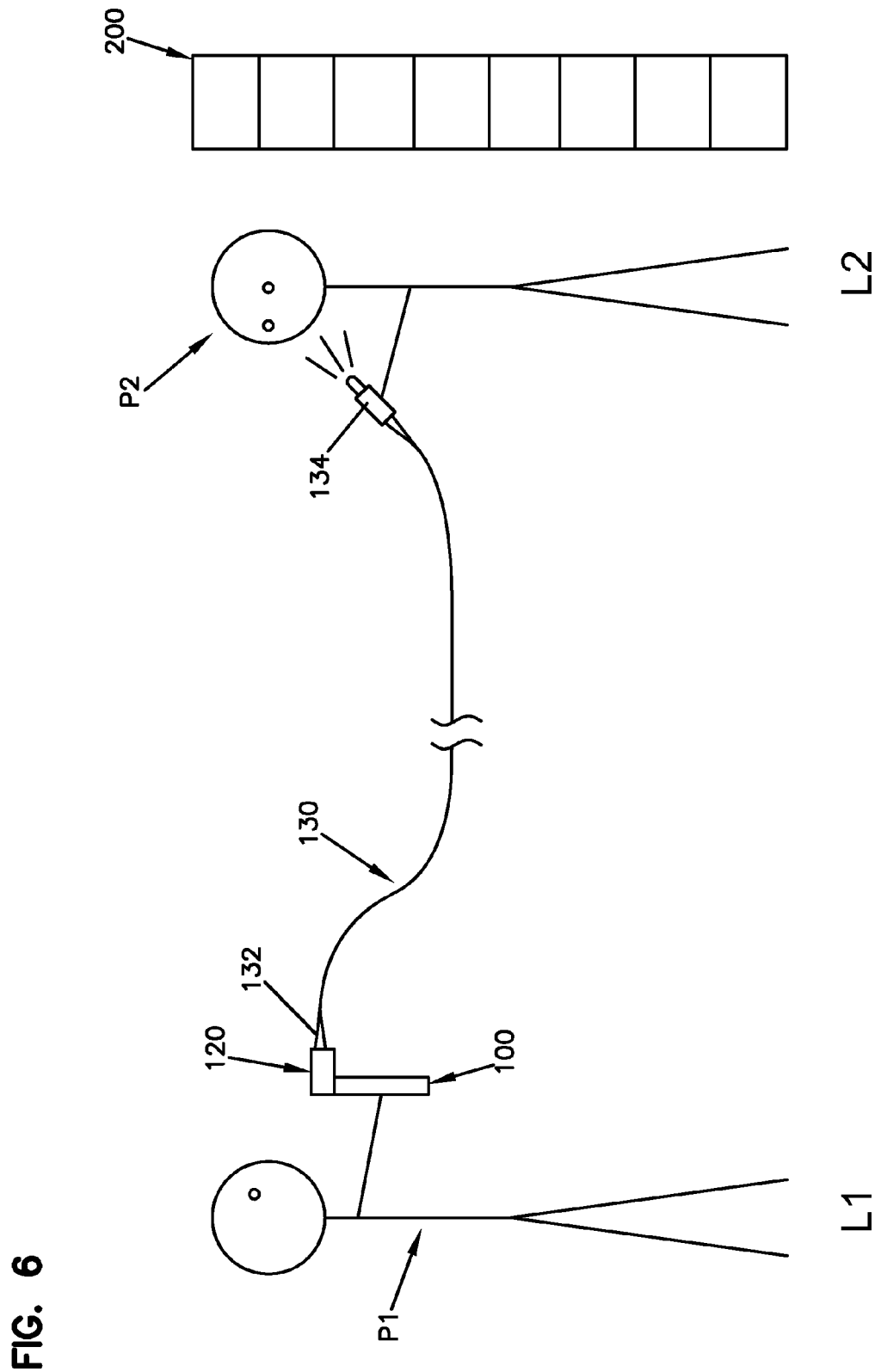
FIG. 6 illustrates two users utilizing the inspection attachment member of FIG. 3 with the portable device of FIG. 1.
Figure 7:
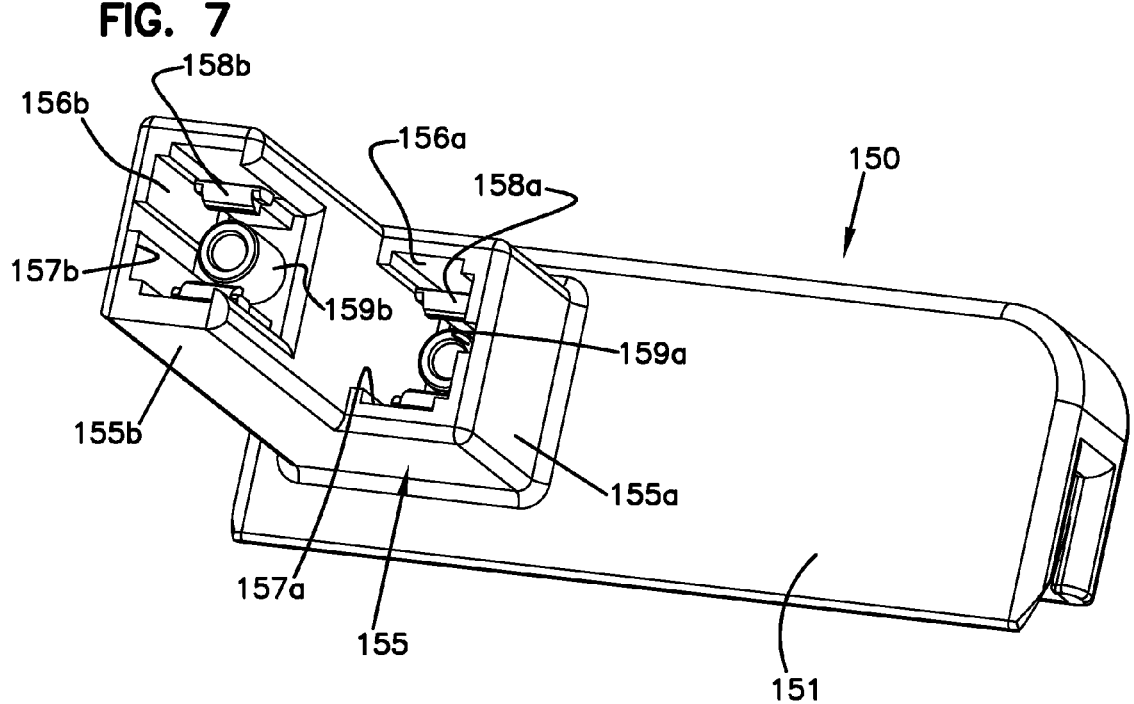
FIG. 7 is a top perspective view of a second example inspection attachment member configured in accordance with the principles of the present disclosure.
Figure 8:
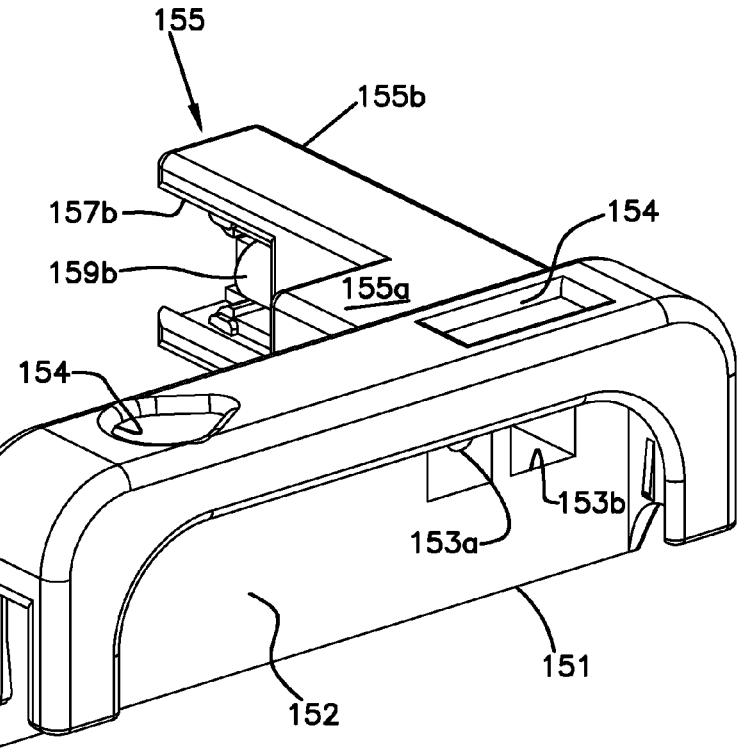
FIG. 8 is a bottom perspective view of the inspection attachment member of FIG. 7.

FIG. 6 shows one example use for the inspection attachment member 120. A first person P1 is situated at a first location L1 and a second person P2 is situated at a second location L2 that is spaced from the first location L1. The first person P1 is holding a portable device 100 (e.g., a smart phone) on which the inspection attachment member 120 is mounted. A first connectorized end 132 of an optical fiber cable 130 is plugged into the port 127 of the inspection attachment member 120. The second person P2 is holding a second end 134 of the optical fiber cable 130. In an example, the second end 134 is a connectorized end.

In some implementations, the first location L1 may be at a first port at which the first connectorized end 132 of the optical fiber 130 is to be plugged and the second location L2 may be at a second port (e.g., at a rack 200) at which the second end 134 is to be plugged, spliced, terminated, optically coupled to equipment, or optically coupled to another fiber. In certain implementations, the first and second locations L1, L2 may be located at different sides of a room. In certain implementations, the first and second locations L1, L2 may be located at different sides of a building. In certain implementations, the first and second locations L1, L2 may be located at different sides of an equipment rack.

In use, the first person P1 manipulates the portable device 100 to activate the light source 118. Light emitted by the light source 118 shines through the first aperture 123 and along the receiving arrangement passage 126 towards the first connectorized end 132 of the optical fiber cable 130. The light is carried by the optical fiber cable 130 from the first connectorized end 132 to the second end 134. The person P2 holding the second end 134 of the optical fiber cable 130 can view the second end 134 to determine whether or not the light is visible. Such a determination checks for continuity of the optical cable. If the light is not visible or is dimmer than normal, then the optical fiber cable 130 may be damaged at one or more points along its length or may be subject to excessive bending.

In some implementations, the inspection of the optical fiber cable 130 is made when the optical fiber cable 130 is being installed in the field. In other implementations, the inspection of the optical fiber cable 130 can be implemented during the lifetime of the optical fiber cable 130. For example, the ends 132, 134 of the optical fiber cable 130 can be unplugged from their respective ports and tested. If the inspection indicates a problem with the optical fiber cable 130, then the cable 130 can be replaced.

FIGS. 7-11 illustrate another example inspection attachment member 150 configured to mount to the portable device 100 of FIGS. 1 and 2. The inspection attachment member 150 includes a base 151 defining an interior 152. The base 151 is sized and shaped to fit over an end (e.g., the top 103, the bottom 104, etc.) of the portable device 100 so that the end of the portable device 100 is disposed within the interior 152 of the base 151. The base 151 also defines ports 154 that provide access to ports on the portable device 100. The base 151 may also define a cutout to inhibit blocking the display screen 115 (e.g., see FIG. 11).

The base 151 defines a first aperture 153*a* that is configured to align with the light source 118 of the portable device 100 when the inspection attachment member 150 is mounted to the portable device 100. The base 151 also defines a second aperture 153*b* that is configured to align with the camera lens 116 of the portable device 100 when the inspection attachment member 150 is mounted to the portable device 100. In the example shown, the second aperture 153*b* is larger than the first aperture 153*a*. In other implementations, however, the apertures 153*a*, 153*b* can be of different sizes.

The inspection attachment member 150 also includes a receiving arrangement 155 extending outwardly from the base 151. The receiving arrangement 155 includes a first portion 155*a* that defines a first passage 156*a* that extends from the first aperture 153*a* to a distal end of the first portion 155*a*. The distal end of the first portion 155*a* defines a first connection port 157*a* providing access to the passage 156*a*. The receiving arrangement 155 also includes a second portion 155*b* that defines a second passage 156*b* that extends from the second aperture 153*b* to a distal end of the second portion 155*b*. The distal end of the second portion 155*b* defines a second connection port 157*b* providing access to the passage 156*a*.

The receiving arrangement 155 is configured to receive a first optical connector 132 at the first portion 155*a* and a second optical connector 134 at the second portion 155*b*. A securement arrangement 158*a*, 158*b* is disposed within each passage 156*a*, 156*b* to retain an optical connector inserted into the connection port 157*a*, 157*b*. In certain implementations, a fiber alignment member 159*a*, 159*b* also is disposed within the passages 156*a*, 156*b* to align optical fibers terminated by the optical connectors 132, 134 with the respective apertures 153*a*, 153*b*.

In certain implementations, each fiber alignment member 159*a*, 159*b* includes a sleeve (e.g., a split sleeve) aligned with the respective aperture 153*a*, 153*b* and configured to receive a ferrule of an optical connector. In certain implementations, each securement arrangement 158*a*, 158*b* includes latching arms configured to snap over sides of the optical connector. In certain examples, each securement arrangement 158*a*, 158*b* and fiber alignment member 159*a*, 159*b* form half of an optical adapter (e.g., see FIG. 7). In an example, the securement arrangement 158*a*, 158*b* and fiber alignment member 159*a*, 159*b* form half of an SC adapter.

In some implementations, the second portion 155*b* of the receiving arrangement 155 also includes a focusing lens 165 disposed in the passage 156*b* (see FIG. 9). The focusing lens 165 is configured to aid the camera lens 116 to focus on the optical connector received at the second port 157*b*. For example, the focusing lens 165 may aid the camera lens 116 from focusing on a distal tip of an optical fiber of the optical fiber cable 130 received at the port 157*b*. In certain implementations, the second portion 155*b* of the receiving arrangement 155 is longer than the first portion 155a to accommodate the focusing lens 165.

FIGS. 10 and 11 show one example use for the inspection attachment member 150. A first optical connector 132 is disposed at the first port 157a and a second optical connector 134 is disposed at the second port 157b. The optical fiber cable 130 carries light emitted by the light source 118 to the second port 157b at which the light enters the focusing lens 165 and the camera lens 116. FIG. 11 illustrates the display screen 115 of the portable device 100 displaying an image 160 based on the light reaching the camera lens 116. In some implementations, the image 160 is a circle (i.e., or other shape) of light from which the continuity of the optical cable 130 can be determined.

In other implementations, the image 160 is a visual representation of the distal tip of the optical fiber carrying the emitted light. In certain implementations, the image 160 includes the distal tip of a ferrule holding the optical fiber. In an example, a user can view the image 160 on the display screen 115 and determine whether the ferrule and/or fiber are damaged (e.g., notched, splintered, fractured, etc.). In another example, a user can view the image 160 on the display screen 115 and determine whether any debris (e.g., dust) or other contaminants (e.g., water) are present on the fiber. In another example the inspection attachment member 150 can be utilized as discussed with reference to FIG. 6.

Additional embodiments include an inspection attachment member 120, 150 which allows the connector 132, 134 to be moved relative to the camera of the portable device 100. For example, moving the connector in a plane parallel to the camera will allow for more precise positioning of the connector for inspection or other operations. Alternatively, or in addition to, the connector may be moved axially relative to the camera toward and away from the camera for more precise positioning of the connector for inspection.

Additional embodiments can include providing a rotatable inspection attachment member 120, 150 for the connector to present the connector end face at an angle relative to the camera.

Additional embodiments may include capturing a photograph of the connector with the portable device 100. The photograph can include additional text added by the user. An application within the portable device may grade the connector based on the visual image as read by the camera. Alternatively, or in addition to, the user may apply a grade to the photograph of the connector. The data associated with the photograph including date, time, location, grade, and other information can be stored with the photograph on the portable device, or sent away to a cloud-based application.

Additional embodiments may include connector identification devices which can be read by the portable device 100. For example, RFID tags, QR codes, barcodes, electrical contact arrangements, visual tags with numbers or letters, and other indicia can be read by the portable device. For example, text or numbers or other indicia on an end face of the ferrule can be read by the camera as part of the inspection process. Additionally, or instead of, identification codes can be located on the cable including RFID tags, QR codes, barcodes, other visual indicia, or electronic codes.

In addition, the portable device can include a self-detection application which detects ferrule size and/or an angled ferrule face to automatically identify to the portable device the ferrule type. In some applications, ferrule polishing by different manufacturers results in a different ferrule end face profile which can be used to identify ferrule polishers and processors.

A multi-fiber connector can also be used with the portable device 100. The inspection attachment member 120, 150 can be provided with a lateral movement mechanism to enable inspection of each individual fiber positioned in the ferrule. Such indexing can be manual, or it can be automated with a mechanical device which provides precise indexing for each fiber.

The portable device 100 can complete the inspection as desired by the user, and then communicate the results via email as desired, or to the cloud. Also, the portable device can provide email support for the technician in the field who may have questions about the process and inspection.

Figure 12:
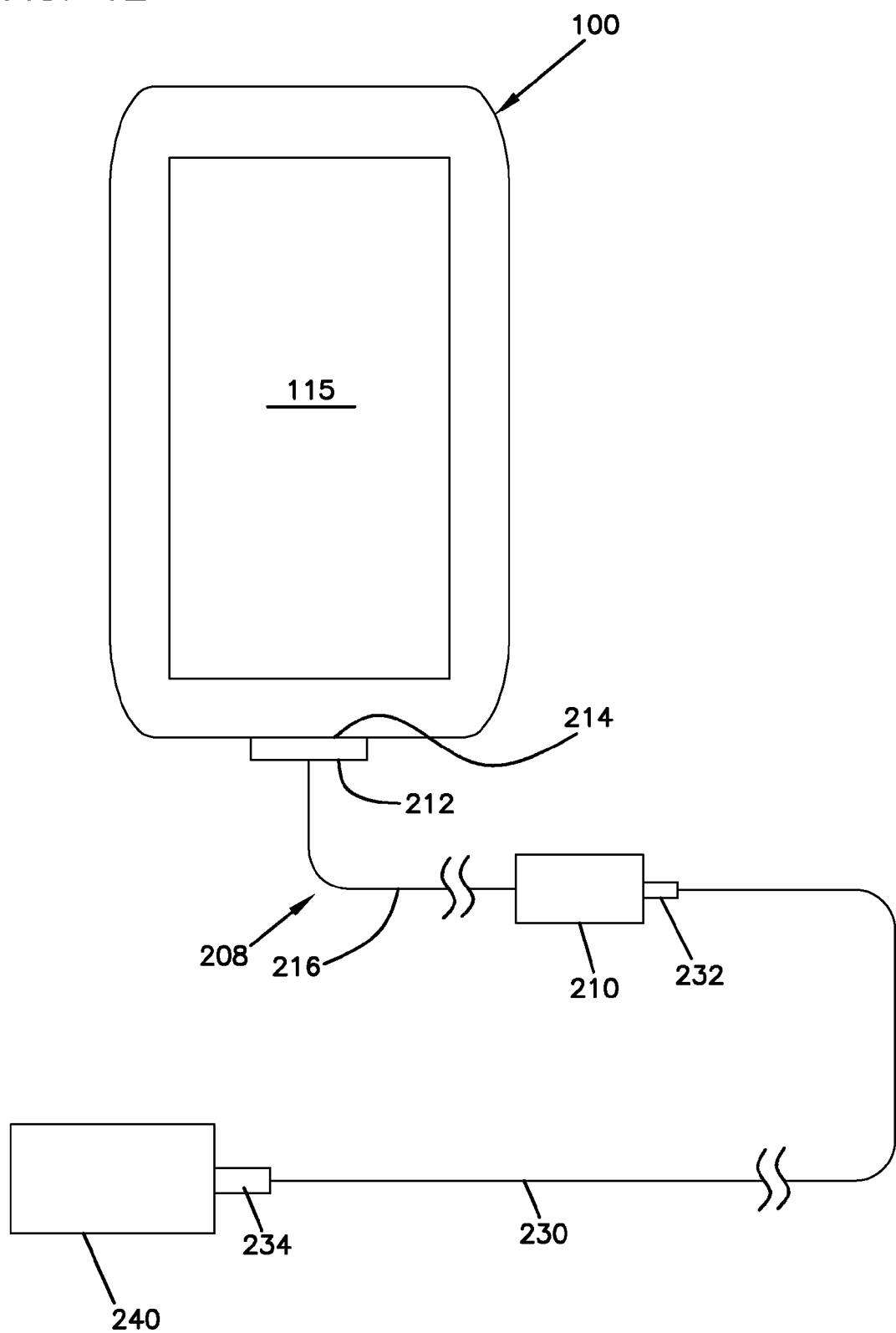
FIG. 12 is a front view of an example portable device including a dongle.

In other applications, the portable device 100 can include a dongle attached to the portable device which allows for other types of inspections or testing of the fiber optic cable and/or connector(s). For example, an OTDR, a power meter, a visual inspection camera, a bit error rate measurement device can be connected via a dongle to the portable device. In FIG. 12, portable device 100 includes a dongle 208 with a remote test device 210. Dongle 208 connects with connection 212 at port 214 of portable device 100. A cable 216 connects test device 210 to connection 212. Test device 210 is illustrated as connecting to first connector 232. First connector 232 can be tested or inspected as needed by device 210. First connector 232 can be connected with a cable 230 to a second connector 234. Cable 230 and connector 234 can be tested as desired with device 210. Second connector 234 can be connected to telecommunications equipment 240 for testing of equipment 240.

With the dongle 208, portable device 100 can be used to run a variety of testing and/or inspection applications. The results can be recorded in device 100 and/or sent from device 100 to another device or the cloud. Portable device 100 allows increased testing of telecommunications connectors, cables and equipment, such as with an OTDR, a power meter, a visual inspection camera, a bit error rate measurement device which are not internal to portable device 100, but all of which can be managed by portable device 100.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An inspection attachment member for a portable device comprising:
   a base defining a hollow interior, the base being configured to mount over an end of a portable device so that the end of the portable device fits within the hollow interior, the base defining a first aperture and a second aperture;
   a receiving arrangement extending outwardly from the base to a distal end, the receiving arrangement defining a first passage aligned with the first aperture and a second passage aligned with the second aperture, each passage extending between the respective aperture and the distal end, the distal end defining a first connection port aligned with the first passage and a second connection port aligned with the second passage;
   a first fiber alignment member disposed in the first passage of the receiving arrangement and aligned with the first aperture;
   a second fiber alignment member disposed in the second passage of the receiving arrangement and aligned with the second aperture;

a first securement arrangement disposed in the first passage of the receiving arrangement, the first securement arrangement configured to receive a first connectorized end of an optical fiber; and a second securement arrangement disposed in the second passage of the receiving arrangement, the second securement arrangement configured to receive a second connectorized end of the optical fiber.

2. The inspection attachment member of claim 1, wherein each fiber alignment member includes a sleeve sized to receive an optical ferrule.

3. The inspection attachment member of claim 1, wherein each securement arrangement includes two latching fingers.

4. The inspection attachment member of claim 1, wherein the first fiber alignment member and the first securement arrangement include half an optical adapter.

5. The inspection attachment member of claim 4, wherein the first fiber alignment member and the first securement arrangement include half an SC optical adapter or an MPO optical adapter.

6. The inspection attachment member of claim 1, wherein the first aperture of the base is located to align with a light source of the portable device.

7. The inspection attachment member of claim 1, wherein the second aperture defined in the base aligns with a camera lens of the portable device.

8. The inspection attachment member of claim 7, further comprising a focusing lens disposed in the second passage of the receiving arrangement.

9. The inspection attachment member of claim 8, wherein the receiving arrangement extends a first distance from the base to define the first passage and extends a second distance from the base to define the second passage, the second distance being longer than the first distance.

10. The inspection attachment member of claim 1, wherein the base defines apertures aligned with ports on the portable device to provide access to the ports.

11. The inspection attachment member of claim 1, wherein the base is configured to cover less than half of an external surface of the portable device.

12. The inspection attachment member of claim 1, wherein the portable device includes a smart phone.

13. The inspection attachment member of claim 1, wherein the portable device includes a digital camera.

14. The inspection attachment member of claim 1, wherein the portable device includes a tablet computer.

15. The inspection attachment member of claim 1, wherein the receiving arrangement is moveable relative to the base to allow a connectorized end of an optical fiber to be moved parallel and/or axially and/or rotationally.

16. The inspection attachment member of claim 1, wherein the portable device records a photographic image and data regarding the image of the connectorized end of an optical fiber.

17. The inspection attachment member of claim 1, wherein the portable device records data regarding the connectorized end of the optical fiber.

18. The inspection attachment member of claim 1, further comprising a dongle attached to the portable device with a remote test device.

19. The inspection attachment member of claim 18, wherein the remote testing device includes one of: an OTDR, a power meter, a visual inspection camera, and a bit error rate measurement device.

20. A method of inspecting a distal end of an optical fiber, the method comprising:
    mounting an inspection attachment member to a portable device, the inspection attachment member defining a first port and a second port, the first port aligning with a light source of the portable device, the second end aligning with a camera lens of the portable device;
    inserting a first end of the optical fiber into the first port of the inspection attachment member to align the first end with the light source;
    inserting a second end of the optical fiber into the second port of the inspection attachment member to align the second end with the camera lens of the portable device; and
    activating a camera on the portable device to view the second end of the optical fiber on a display screen of the portable device.

21. The method of claim 20, further comprising activating the light source of the portable device to shine a light along the optical fiber.

22. The method of claim 20, wherein the portable device includes a smart phone.

23. The method of claim 20, wherein the portable device includes a digital camera.

24. The method of claim 20, wherein the first end of the optical fiber is connectorized by a fiber optic connector; and wherein inserting the first end of the optical fiber into the first port comprises inserting the fiber optic connector into a half-adapter defining the first port.

25. The method of claim 20, further comprising determining whether the second end of the optical fiber has damage or debris.

26. The method of claim 20, further comprising:
    disengaging the first end of the optical fiber from the first port;
    disengaging the second end of the optical fiber from the second port;
    inserting the second end of the optical fiber into the first port;
    inserting the first end of the optical fiber into the second port;
    activating the camera on the portable device to view the first end of the optical fiber on a display screen of the portable device.

27. The method of claim 26, further comprising activating the light source of the portable device to shine a light along the optical fiber.

28. The method of claim 26, further comprising determining whether the first end of the optical fiber has damage or debris.

29. The method of claim 20, further comprising recording a photographic image obtained from the camera and data regarding the image of the second end of the optical fiber.

30. The method of claim 20, further comprising recording on the portable device data regarding the second end of the optical fiber.

* * * * *